United States Patent
Ananthapur Bache et al.

(10) Patent No.: US 10,993,099 B2
(45) Date of Patent: Apr. 27, 2021

(54) HETEROGENEOUS INTERNET OF THINGS ENVIRONMENT DEVICE COMMUNICATION SOLUTION

(71) Applicant: International Business Machines Corporation, Armonk, NY (US)

(72) Inventors: Vijay Kumar Ananthapur Bache, Bangalore (IN); Vijay Ekambaram, Chennai (IN); Srikanth K. Murali, Bangalore (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/850,198

(22) Filed: Dec. 21, 2017

(65) Prior Publication Data

US 2019/0200198 A1   Jun. 27, 2019

(51) Int. Cl.
*H04W 56/00*   (2009.01)
*H04L 29/06*   (2006.01)
(Continued)

(52) U.S. Cl.
CPC ............. *H04W 4/70* (2018.02); *H04L 67/12* (2013.01); *H04L 69/18* (2013.01); *G16Y 10/80* (2020.01); *H04L 69/22* (2013.01)

(58) Field of Classification Search
None
See application file for complete search history.

(56) References Cited

U.S. PATENT DOCUMENTS 8,234,128 B2   7/2012   Martucci et al.
8,405,502 B2   3/2013   Teague
(Continued)

FOREIGN PATENT DOCUMENTS

| EP | 3 148 226 A1 | 3/2017 |
|----|--------------|--------|
| WO | 2014/131038 A1 | 8/2014 |
| WO | 2015/024349 A1 | 2/2015 |

OTHER PUBLICATIONS

Mike Blackstock et al., "IoT Interoperability: A Hub-based Approach", In Internet of Things (IOT), IEEE, 2014, 6 pages.
(Continued)

*Primary Examiner* — Nicholas R Taylor
*Assistant Examiner* — Ho T Shiu
(74) *Attorney, Agent, or Firm* — William H. Hartwell; Hunter E. Webb; Keohane & D'Alessandro, PLLC

(57) ABSTRACT

Aspects of the present invention provide a software defined radio (SDR) system and/or an approach for enabling heterogeneous device communications using a SDR device in an internet of things (IoT) environment. In an embodiment, the SDR device (e.g., a network adapter thereof) obtains a set of communications sent by an IoT device. Based on an analysis of the set of communications by an SDR bot running on the SDR device, a protocol of the set of communications is determined. The SDR bot interprets a communication of the set of communications, and, based on the interpreted communication, a notification is forwarded by the SDR device (e.g., by the network adapter). This notification can include an instruction to another IoT device to perform a task, a report based on communications from multiple IoT devices, or the like.

20 Claims, 6 Drawing Sheets

(51) Int. Cl.
*H04L 29/08* (2006.01)
*H04W 4/70* (2018.01)
*G16Y 10/80* (2020.01)

(56) References Cited

U.S. PATENT DOCUMENTS

| | | | |
|---|---|---|---|
| 9,008,658 B2 | 4/2015 | Baker et al. | |
| 9,211,065 B2 | 12/2015 | Marsh et al. | |
| 9,456,090 B2 | 9/2016 | Shankaranarayanan | |
| 2007/0086480 A1* | 4/2007 | Elzur | H04L 47/10 370/463 |
| 2014/0244833 A1 | 8/2014 | Sharma et al. | |
| 2017/0155703 A1* | 6/2017 | Hao | H04L 67/12 |
| 2017/0164417 A1* | 6/2017 | Kress | H04W 76/14 |
| 2017/0345420 A1* | 11/2017 | Barnett, Jr. | G06F 3/167 |
| 2019/0158975 A1* | 5/2019 | Petersen | H04L 69/18 |

OTHER PUBLICATIONS

Pratikkumar Desai et al., "Semantic Gateway as a Service architecture for IoT Interoperability", In Mobile Services (MS), IEEE, 2015, 16 pages.

G. Aloi et al., "A Mobile Multi-Technology Gateway to Enable IoT Interoperability", 2016 IEEE First International Conference on Internet-of-Things Design and Implementation, pp. 259-264.

Kangho Hur et al., "Automated Deployment of IoT Services Based on Semantic Description", Copyright 2015 IEEE, 6 pages.

Xiao Ming Zhang, "An Open, Secure and Flexible Platform Based on Internet of Things and Cloud Computing for Ambient Aiding Living and Telemedicine", Copyright 2011 IEEE, 4 pages.

G. Aloi et al., "Enabling IoT interoperability through opportunistic smartphone-based mobile gateways", Journal of Network and Computer Applications, 2016, 11 pages.

* cited by examiner

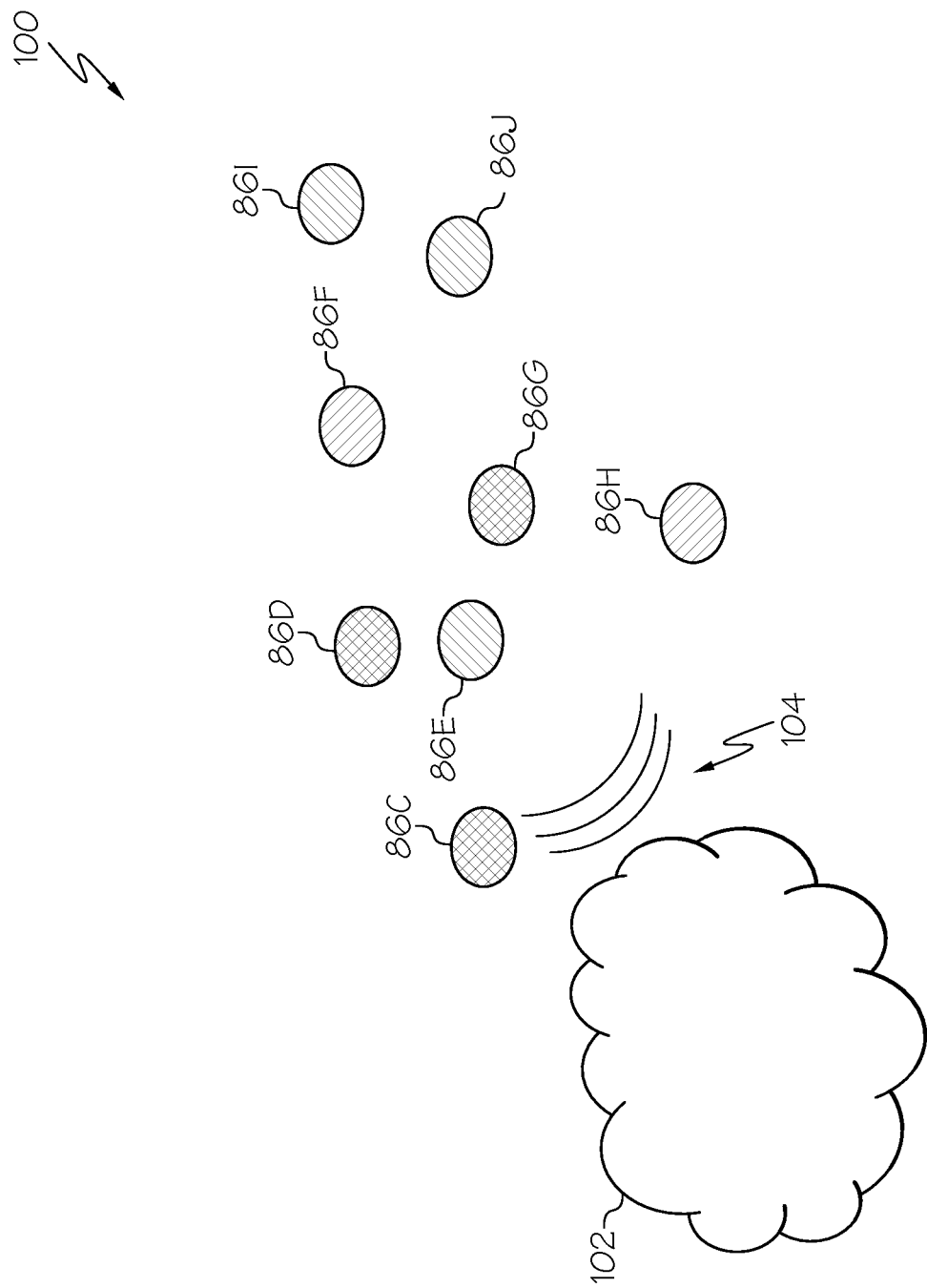

HETEROGENEOUS INTERNET OF THINGS ENVIRONMENT DEVICE COMMUNICATION SOLUTION

TECHNICAL FIELD

The subject matter of this invention relates generally to multi-device communications. More specifically, aspects of the present invention provide a solution that enables communications with a plurality of internet of things devices in a heterogeneous internet of things environment.

BACKGROUND

In the information technology (IT) environment of today, an increasing number of devices that were previously non-computerized are equipped with computer processing and/or communication technology. Ordinary household systems such as appliances, lighting, climate control, and/or the like, can now include technology that enables the systems to connect to and communicate with a network, such as the Internet. This equipping of everyday physical objects to connect and/or identify themselves to the Internet has coined a new term, the internet of things (IoT).

Devices in the IoT can communicate information regarding any aspect of their operations, including, for example: power usage, process initiation, process completion, operating conditions, external conditions, malfunctions, and/or the like. To this extent, these communications can occur using a variety of different technologies including, but not limited to: radio frequency identification (RFiD), WiFi, wireless, Bluetooth, infrared, and/or the like. (WiFi is a trademark of the WiFi Alliance; Bluetooth is a trademark of Bluetooth SIG).

SUMMARY

In general, aspects of the present invention provide a software defined radio system (SDR) and/or an approach for enabling heterogeneous device communications using a SDR device in an internet of things (IoT) environment. In an embodiment, the SDR device (e.g., a network adapter thereof) obtains a set of communications sent by an IoT device. Based on an analysis of the set of communications by an SDR bot running on the SDR device, a protocol of the set of communications is determined. The SDR bot interprets a communication of the set of communications, and, based on the interpreted communication, a notification is forwarded by the SDR device (e.g., by the network adapter). This notification can include an instruction to another IoT device to perform a task, a report based on communications from multiple IoT devices, or the like.

One aspect of the invention provides a software defined radio (SDR) system, comprising: a memory medium; a bus coupled to the memory medium; and a processor coupled to the bus; a network adapter; and an SDR bot deployed by the processor to enable heterogeneous device communications in an internet of things (IoT) environment, the SDR bot performing a set of tasks, comprising: obtaining from the network adapter, a set of communications sent by an IoT device; determining, based on an analysis of the set of communications, a protocol of the set of communications; interpreting a communication of the set of communications based on the protocol; and forwarding a notification based on the interpreted communication.

Another aspect of the invention provides a method for enabling heterogeneous device communications in an internet of things (IoT) environment, comprising: obtaining, by a software defined radio (SDR) device, a set of communications sent by an IoT device; determining, based on an analysis of the set of communications by an SDR bot running on the SDR device, a protocol of the set of communications; interpreting a communication of the set of communications by the SDR bot based on the protocol; and forwarding, by the SDR device, a notification based on the interpreted communication.

Yet another aspect of the invention provides a computer program product for enabling heterogeneous device communications in an internet of things (IoT) environment, the computer program product comprising a computer readable storage media, and program instructions stored on the computer readable storage media, that cause at least one computer device to: obtain, by a software defined radio (SDR) device, a set of communications sent by an IoT device; determine, based on an analysis of the set of communications by an SDR bot running on the SDR device, a protocol of the set of communications; interpret a communication of the set of communications by the SDR bot based on the protocol; and forward, by the SDR device, a notification based on the interpreted communication.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIGS. 3A-B depict an example IoT environment according to an embodiment of the present invention;

Figure 1:
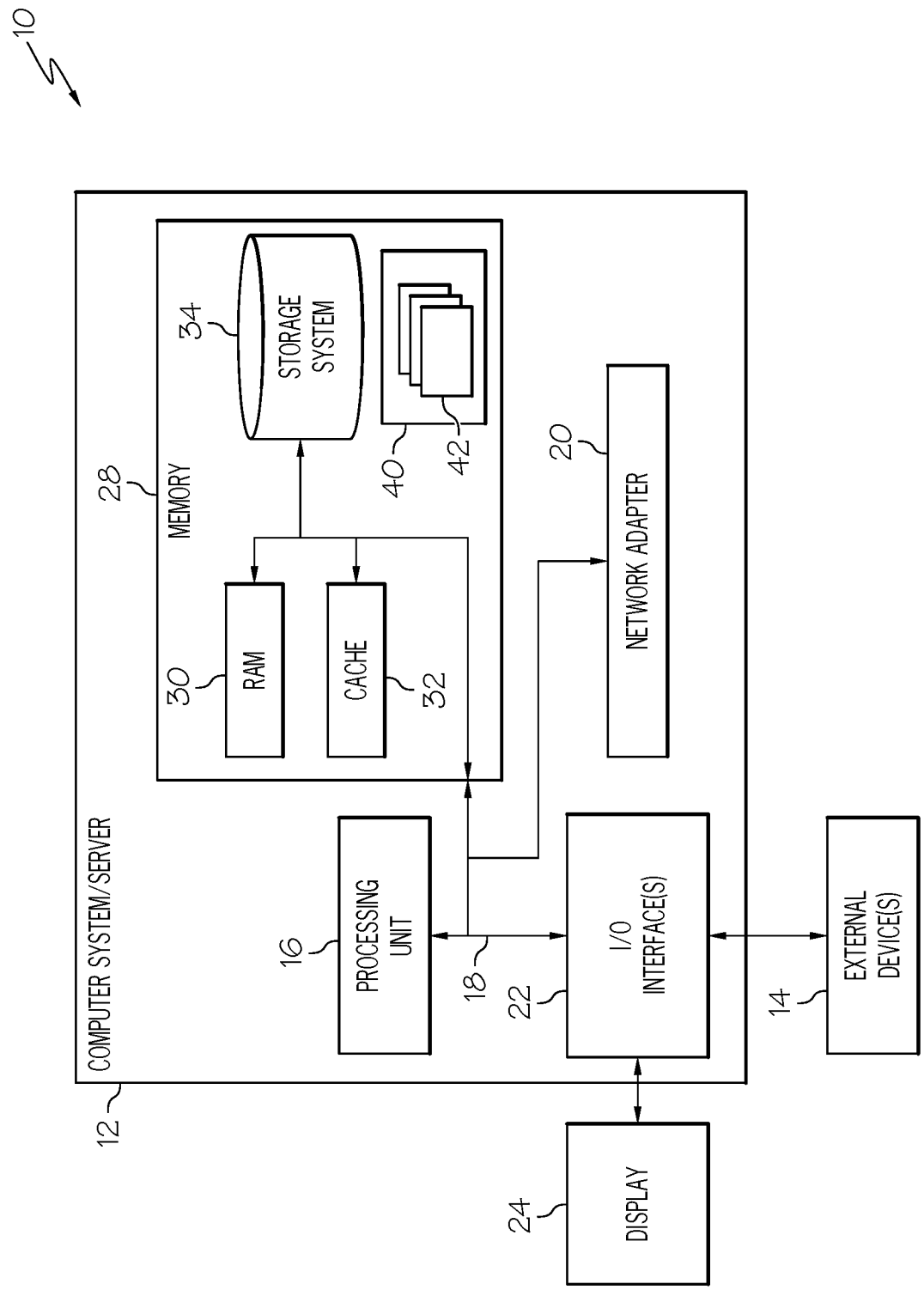
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide a software defined radio system (SDR) and/or an approach for enabling heterogeneous device communications using a SDR device in an internet of things (IoT) environment. In an embodiment, the SDR device (e.g., a network adapter thereof) obtains a set of communications sent by an IoT device. Based on an analysis of the set of communications by an SDR bot running on the SDR device, a protocol of the set of communications is determined. The SDR bot interprets a communication of the set of communications, and, based on the interpreted communication, a notification is forwarded by the SDR device (e.g., by the network adapter). This notification can include an instruction to another IoT device to perform a task, a report based on communications from multiple IoT devices, or the like.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and/or Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
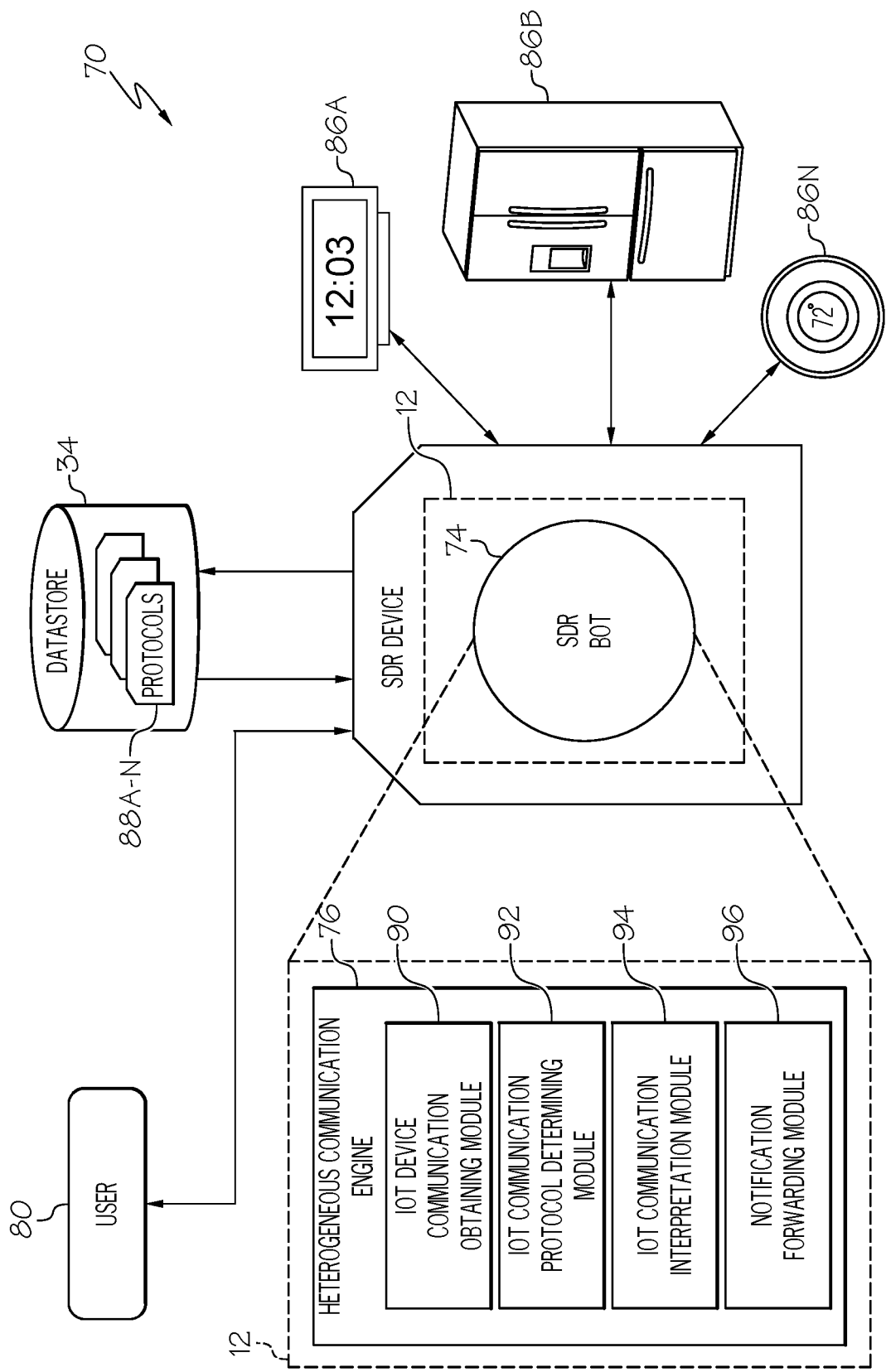
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 2 for illustrative purposes only. In the event the teachings recited herein are practiced in a networked computing environment 70, each SDR device 72 and/or SDR bot 74 within SDR device 72 need not have a heterogeneous communication engine (hereinafter "system 76"). Rather, system 76 could be loaded on a server or server-capable device that communicates (e.g., wirelessly) with SDR device 72 to provide processing therefor. Regardless, as depicted, system 76 is shown within computer system/server 12. In general, system 76 can be implemented as program/utility 40 on computer system 12 of FIG. 1 and can enable the functions recited herein. It is further understood that system 76 may be incorporated within or work in conjunction with any type of system that receives, processes, and/or executes commands with respect to IT resources in a networked computing environment. Such other system(s) have not been shown in FIG. 2 for brevity purposes.

Along these lines, system 76 may perform multiple functions similar to a general-purpose computer. Specifically, among other functions, system 76 can enable heterogeneous device communications (e.g., among a plurality of IoT devices 86A-N) in an IoT environment. To accomplish this, system 76 can include: an IoT device communication obtaining module 90, an IoT communication protocol determining module 92, an IoT communication interpretation module 94, and a notification forwarding module 96.

Referring now to FIG. 3A, an example IoT environment 100 is shown according to an embodiment of the invention. As shown, IoT environment 100 has a number of IoT devices 86C-J (hereinafter 86N for singular and 86A-N for plural). IoT devices 86A-N could include, but are not limited to: large appliances (e.g., a refrigerator, a dishwasher, a washing machine, a dryer, and/or the like); small appliances (e.g., a toaster, a toaster oven, a microwave, a mixer, a blender, and/or the like); entertainment devices (e.g., a television, a radio, a media player, a gaming system, and/or the like); cleaning devices (e.g., a vacuum cleaner, an air purifier, and/or the like); climate control systems (e.g., a thermostat, a heater, a fan, an air conditioner, and/or the like); lighting systems (e.g., a lamp, a light fixture, a light switch, and/or the like); measuring devices (e.g., a clock, a scale, a thermometer, and/or the like); and/or any member of the internet of things that is now known or later developed. In any case, each IoT device 86N has the ability to send and/or receive communications 104 (e.g., with a network 102). These communications 104 can be sent by IoT devices 86A-N using a variety of different technologies including, but not limited to: radio frequency identification (RFiD), WiFi, wireless, Bluetooth, infrared, and/or the like (WiFi is a trademark of the WiFi Alliance; Bluetooth is a trademark of Bluetooth SIG). As shown, IoT devices 86A-N are sending communications 104 using three different technologies, with IoT devices 86C, 86D, and 86G sending communications 104 using a first technology; IoT devices 86E, 86I, and 86J sending communications 104 using a different second technology; and IoT devices 86F and 86H sending communications 104 using a different third technology.

The inventors of the invention described herein have discovered certain deficiencies in the current solutions for enabling communications 104 of IoT devices 86A-N in IoT environment 100. For example, the diversity in IoT technology in terms of in the hardware, network and protocol aspects among different IoT devices 86A-N makes inter-operability among such heterogeneous IoT deployments so as to provide quality service to the end user 80 (FIG. 2) difficult if not impossible. One existing solution for attempting to provide such inter-operability uses hard-wired discovery and interaction protocols. However, these protocols are not scalable and fail to be generic enough to account for the wide range of variations. Further, the technology used to perform the discovery often involves a steep learning curve and can be complicated for the end-user 80 (FIG. 2) to interact with and/or to manage. As such, there is currently no mechanism to facilitate heterogeneous IoT devices 86A-N to seamlessly communicate 104 with other IoT devices 86A-N that use different technologies, protocols, etc. Further, there is currently no device that can passively learn protocols of different types of IoT devices 86A-N and that can facilitate a conversational interaction between the IoT devices 86A-N and/or with the end-users 80 (FIG. 2).

Figure 3B:
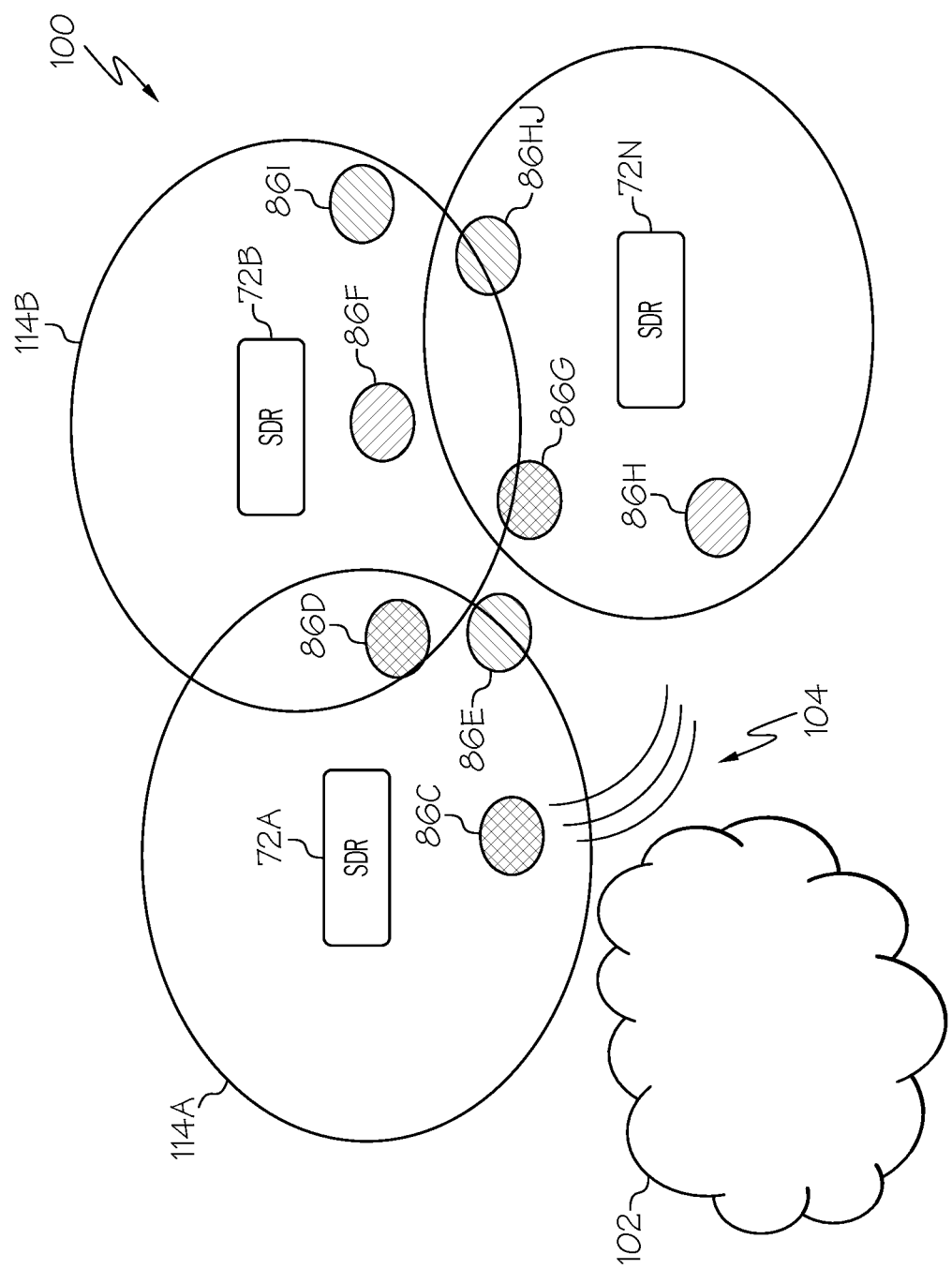

Referring now to FIG. 3B, IoT environment 100 of FIG. 3A has been modified as shown according to an embodiment of the invention. As shown, a number of SDR devices 72A-N (generically 72) have been deployed in IoT environment 100. Referring additionally to FIG. 2, each SDR device 72 has an SDR bot 74 deployed by the processor. SDR bot 74 is a software agent that has datastore 34 of standard protocols 88A-N (generically 88N) used in IoT environment 100. To this extent, SDR bot 74 is designed to be able to process communications from IoT devices 86A-N, determine the protocols 88A-N of the process communications, and interpret the communications in order to facilitate interoperability among IoT devices 86A-N. In order to accomplish this, a single SDR bot 74 can be designed to process a single type of communication, multiple types of communications, or all types of communications technologies. SDR bots 74 in multiple SDR devices 72 can collaborate to determine the type of communication as will be described in detail.

Figure 4:
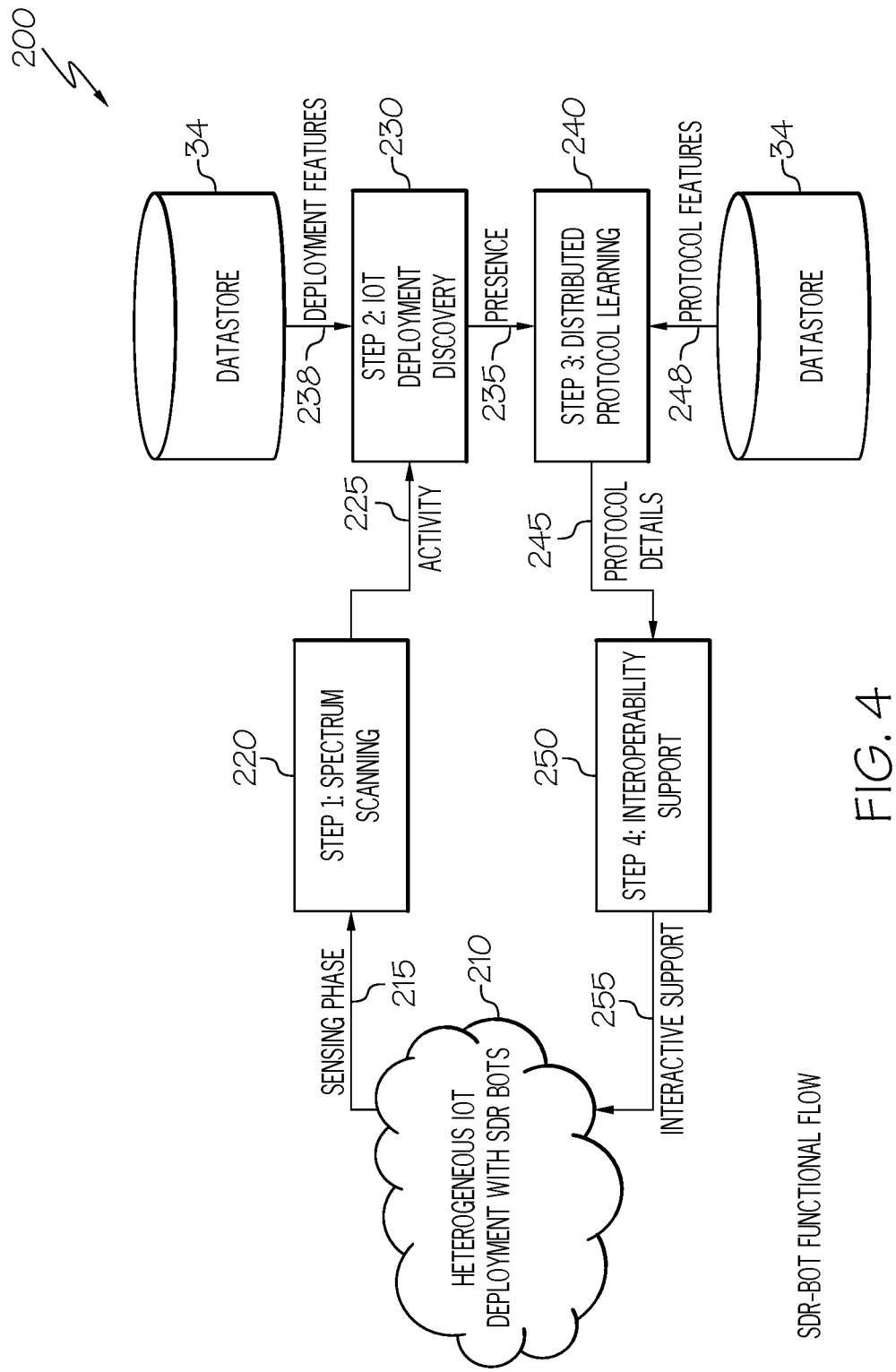
FIG. 4 depicts an example data flow according to an embodiment of the present invention.

Referring now to FIG. 4, an example data flow 200 is shown according to an embodiment of the present invention. As shown, data flow 200 begins with a heterogeneous IoT deployment with SDR bots 210. Referring additionally to FIGS. 2 and 3B, IoT device communication obtaining module 90 of system 76, as executed by computer system/server 12 (e.g., in SDR device 72), is configured to obtain a set of communications 104 sent by an IoT device 86N. As shown, each SDR device 72 can have a network adapter that allows the SDR device 72 to capture communications 104 (e.g., intercepted between an IoT device 86N and network 102) within a capture range 114A-N (generically 114N) of the corresponding SDR device 72A-N. As such, once SDR device 72 has been deployed, SDR device 72 begins a sensing phase 215. In sensing phase 215, SDR device 72 has the ability to perform spectrum scanning 200 to scan the electromagnetic (EM) spectrum for communications 104 within capture range 114N associated with SDR device 72. In an embodiment, this spectrum scanning 200 can be continuous. Alternatively, SDR device 72 can perform spectrum scanning 200 periodically according to a scanning schedule. In this embodiment, SDR device 72 can prioritize the scanning schedule based on the likelihood of IoT device 86A-N communication activity based on information about previous communications 104 stored in the datastore 34 and/or additional apparatus such as directional antennae.

In any case, if any spectrum activity 225 is detected, IoT deployment discovery 230 can be performed. In IoT deployment discovery 230, the area of deployment of IoT devices 86A-N (e.g., deployment features 238) can be estimated based on the scan results from spectrum scanning 220. This estimate can be verified and/or defined by communication of the findings from IoT deployment discovery 230 with other SDR devices 72A-N deployed within IoT environment 100. In addition, IoT deployment discovery 230 can also extract other features of the communication pattern, including, but not limited to: the duration and period of activity, intensity, frequency, phase, and/or the like. These deployment features 238 can then be passed to the learning step in response to the detected presence 235 of activity 225.

IoT communications protocol determining module 92 of system 76, as executed by computer system/server 12 (e.g., in SDR device 72), is configured to determine a protocol 88N of set of communications 104 received by IoT communication obtaining module 90. In an embodiment, the communication 104 can be forwarded to SDR bot 74 (e.g., as determined by IoT deployment discovery 230). This SDR bot 74 can be an SDR bot 74 that is configured to process communications 104 that have the technology used to send the communication 104. To this extent, one SDR bot 74 can be designated to process some or all communications 104 sent using one communication technology while a different SDR bot 74 can be designated to process communications 104 sent using a different communication technology.

In any case, the determining of the protocol 88N can be performed based on an analysis of set of communications 104 by SDR bot 74 running on SDR device 72. In an embodiment, SDR bot 74 parses packets of communication 104 captured by SDR device 72 (e.g., network adapter thereof). These packets can be completely parsed by SDR bot 74 from the physical layer through the application layer. First, the bits of received communication 104 are parsed and cross-checked with known data using definitions of known protocols 88A-N (frame, packet, interaction etc.). For instance, in one particular known protocol 88N, the first three numbers of a mac-address may reference the organization. Then, protocols 88A-N are identified using the packet/frame data, and a stack is built by SDR bot 74. If there is any missing information (e.g., an ACK which was supposed to be generated, but was not captured), then SDR bot 74 seeks more information.

In an embodiment, the information on such anomalies can be filled in with information from additional packets from additional obtained communication 104. These additional communications 104 can be obtained by SDR device 72, itself. Additionally, or in the alternative, the additional communications 104 and/or analysis of the additional communications 104 can be obtained from other SDR devices 72A-N in IoT environment 100 using distributed protocol learning 240. Distributed protocol learning 240 allows SDR devices 72A-N in IoT environment 100 to share the learned protocol features 248 and training with each other to gain a complete picture of the deployments in a region. Techniques like transfer learning could be used for this purpose. For example, SDR device 72 performing an analysis of a communication 104 could send an inquiry for protocol information about the communication 104 to another SDR device 72N. In response to the inquiry, IoT communications protocol determining module 92 of the other SDR device 72N could analyze the communication to determine the protocol 88N based on protocol features 248 resulting from an analysis of a previous communication that is stored in a memory medium (e.g., datastore 34) of the other device 72N. The other SDR device 72N can then forward this determined result to SDR device 72. In any case, once all of the information has been acquired, the protocol 88N of the communications can be determined based on the stack.

Once a protocol 88N has been determined for communication 104, IoT communications protocol determining module 92 can further perform active verification of the determination. In an embodiment, IoT communications protocol determining module 92 can construct simulation packets using the determined protocol 88N. These simulation packets can be forwarded to the target IoT device 86N in order to verify the protocol formats 88A-N inferred from the passive monitoring. If the verification succeeds in getting a protocol-compliant response, then the IoT device 86N is tagged with the inferred protocol 88N. Otherwise, IoT communications protocol determining module 92 can repeat the passive monitoring processes with a different protocol 88N in datastore 34.

In any case, once the protocol 88N has been determined and verified, the knowledge can be exchanged with other SDR devices 72A-N in IoT environment 100 so as to ensure reliability in the communication links. This ensures that if one or more of the SDR devices 72A-N fail, other SDR devices 72A-N can step in to provide inter-operability service, avoiding single HUB failure scenarios. To this extent, each SDR device 72A-N can incrementally build a picture of protocols 88A-N that is used for communications 104 of all of IoT devices 86A-N in the region.

IoT communication interpretation module 94 of system 76, as executed on computer system/server 12 (e.g., in SDR device 72), is configured to interpret a communication 104 of the set of communications 104. In an embodiment, the SDR bot 74 associated with the protocol 88N can use the protocol 88N to interpret the communication 104.

Notification forwarding module 96 of system 76, as executed on computer system/server 12 (e.g., in SDR device 72), is configured to forward a notification based on the interpreted communication 104. This notification can include an instruction sent by SDR device 72 (e.g., via the network adapter) based on the interpreted communication from one IoT device 86A that causes a second IoT device 86N to perform an action. For example, assume IoT device 86A is an alarm clock. SDR device 72 could intercept and, based on a previous determination of its protocol, translate a communication that indicates that the alarm has been turned off. SDR device 72 could then forward a notification to IoT device 86N, which is a thermostat, to raise the temperature in the house by a pre-determined amount. Similarly, SDR device 72 could forward a notification to another IoT device 86D, which may be a coffee maker, to begin brewing coffee.

These notifications can be sent directly to the other IoT devices 86A-N if the other IoT devices 86A-N are within the capture range 114N of SDR device 72. Alternatively, if the other IoT devices 86A-N are not within the capture range 114N of SDR device 72, the notification can be forwarded to another SDR device 72N that has the IoT device 86N for which the notification is intended within its capture range 114N. The other SDR device 72N can then forward the notification to the IoT device 86N.

Alternatively, the notification could be a report that is based on information received from multiple IoT devices 86A-N. For example, assume that user 80 wants to learn about the power consumption from IoT devices 86A-N in IoT environment 100. User 80 can request the report (e.g., via a graphical user interface). One or more SDR devices 72A-N could collect and, based on previous determinations of protocols 88A-N, translate communications 104 from the IoT devices 86A-N. These communications 104 can be communications that are sent by IoT devices 86A-N in the normal course of their operations, or, alternatively, can be sent in response to requests generated based on the user 80 request. In any case, SDR bots 74 in the one or more SDR devices 72A-N can interpret the communications 104 based on the previously determined protocols. The information contained in the interpreted communications 104 can be aggregated into a report, and the report can be forwarded as the notification (e.g., to user 80).

To this extent, system 76 is able to provide interactive support 255 to IoT devices 86A-N that utilize different transmission technologies and/or protocols in heterogeneous IoT deployment with SDR bots 210. As such, interoperability support 250 can use protocol details 245 from distributed protocol learning 240 to provide seamless communication between deployments of IoT devices 86A-N that follow different protocols that transmit on different bands of the spectrum, etc. Without SDR device 72 and SDR bots 74 contained therein, these deployments would be disconnected network components. In any case, interoperability support 250 could be leveraged in a variety of different ways. For example, SDR bots 74 could be used as bridges between IoT devices 86A-N, providing protocol translation services between heterogeneous deployments for inter-operability at the lower levels of protocol and/or when the devices are too low power to provide higher protocol services.

In another example, SDR bots 74 could be used as conversational agents, providing a conversational interface using tools like Watson conversation or neural conversational models (Watson is a trademark of International Business Machines in the U.S. and/or other countries). While acting as conversational agents, bots 74 could perform end-user 80 application tasks such as, without limitation, conversing with users 80, receiving exploratory queries through conversations, interpreting the queries, connecting with IoT devices 86A-N and/or obtaining the necessary sensory data for user 80.

Additionally or in the alternative, these conversational agents could also perform management tasks, to be "management points" for managing IoT devices 86A-N through conversation. For example, a maintenance person could communicate with an SDR bot 74 (e.g., through a mobile device) to ask for it to identify regions of bad link quality. SDR bot 74 could then disseminate a query to fetch this information from IoT devices 86A-N and could provide the necessary analytics to the support person based on the information sent by IoT devices 86A-N.

Additionally or in the alternative, as conversational agents, SDR bots 74 could be used to push events based on interpreted communications 104 from IoT devices 86A-N. For example, SDR bots 74 can interface with messenger apps associated with user 80 (e.g., Telegram, Facebook messenger, and/or the like) to provide pro-active event notifications based on interpreted communications 104 (Telegram is a trademark of Telegram, LLC and Facebook is a trademark of Facebook, Inc., in the U.S. and/or other jurisdictions).

In an example, consider a smart home in which the individual home appliances (e.g., coffee machine, washing machine, oven etc.) are from different IoT companies. Assume also that the smart electric network supplying power to the house has a different provider from the individual home appliances. Suppose the owner of the house, user 80, wishes to know how much power is drawn from the smart electric network (e.g., smart meter) by the above devices. SDR bot 74 enables communication between the electric network and the home appliances and facilitates the collection of information including appliance-specific power consumption, user's 80 appliance usage pattern, whether a malfunction in the one or more appliances is causing power drain, etc. SDR bot 74 can then present the above information to the house owner as he converses with it.

Figure 5:
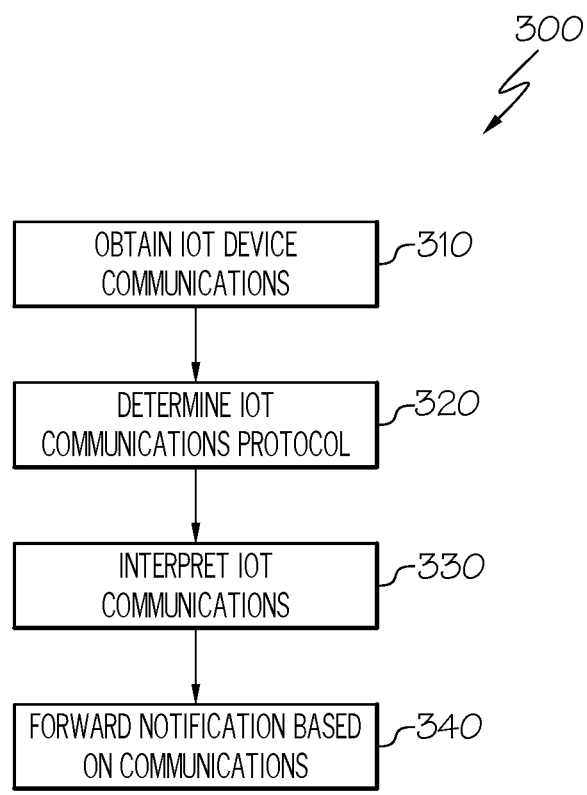
FIG. 5 depicts an example process flowchart according to an embodiment of the present invention.

Referring now to FIG. 5 in conjunction with FIGS. 2 and 3B, a process flowchart 300 according to an embodiment of the present invention is shown. At 310, IoT device communication obtaining module 90 of system 76, as executed by computer system/server 12 (e.g., in SDR device 72), causes a deployed SDR device 72 (e.g., a network adapter thereof) to obtain a set of communications 104 sent by an IoT device. At 320, IoT communications protocol determining module 92, as executed by computer system/server 12 (e.g., in SDR device 72), causes one or more SDR bots 74 to determine a protocol of the set of communications 104 based on an analysis of one or more communications 104 in the set. Distributed protocol learning 240 (FIG. 3) can leverage multiple SDR devices 72A-N in IoT environment 100 to perform the analysis. At 330, IoT communication interpretation module 94, as executed by computer system/server 12 (e.g., in SDR device 72), causes an SDR bot 74 to interpret an incoming communication based on the determined protocol. Finally, at 340, notification forwarding module 96, as executed by computer system/server 12 (e.g., in SDR device 72), causes SDR device (e.g., the network adapter) to forward a notification based on the interpreted communication.

The process flowchart of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for enabling heterogeneous device communications in an internet of things environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for enabling heterogeneous device communications in an internet of things environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for enabling heterogeneous device communications in an internet of things environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 76 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for enabling heterogeneous device communications in an internet of things environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A software defined radio (SDR) system, comprising:
   a memory medium;
   a bus coupled to the memory medium; and
   a processor coupled to the bus;
   a network adapter; and
   a plurality of SDR bots deployed by the processor to enable heterogeneous device communications in an internet of things (IoT) environment, each SDR bot of the plurality of SDR bots being deployed on a different SDR device, being designed to process a single set type of communication, and performing a set of tasks, comprising:
      obtaining from the network adapter, a set of communications sent by an IoT device using a first technology;
      collaborating with others of the plurality of SDR bots to determine, based on an analysis of the set of communications, a protocol of the set of communications;
      forwarding a simulation packet to the IoT device using the determined protocol in order to verify a format of the determined protocol;
      verifying, in response to a receipt of a protocol-compliant response from the IoT device in reaction to the simulation packet, that the determined protocol is associated with the IoT device;
      interpreting a communication of the set of communications based on the protocol; and
      forwarding a notification in the communication from the IoT device based on the interpreted communication, wherein the forwarding of the notification includes sending, via the network adapter, an instruction initiated by the IoT device to a second IoT device using a second technology in a protocol of the second IoT device that causes the second IoT device to perform an action based on information about the IoT device contained in the interpreted communication.

2. The system of claim 1, wherein the set of tasks further comprises performing spectrum scanning to scan an electromagnetic (EM) spectrum for communications from IoT devices within a capture range of the network adapter.

3. The system of claim 1, wherein the communication technology is selected from a group, comprising: radio frequency identification (RFiD), WiFi, wireless, Bluetooth, and infrared.

4. The system of claim 1, wherein the forwarding of the notification includes sending, via the network adapter, an instruction to a second IoT device in a protocol of the second IoT device that causes the second IoT device to perform an action based on the interpreted communication.

5. The system of claim 1, the set of tasks further comprising:
   storing a result of the determining in the memory medium;
   analyzing a third set of communications in response to a receipt via the network adapter of an inquiry from a second SDR system regarding the third set of communications;
   determining, based on the result, the protocol of the third set of communications; and
   forwarding, in response to the determining, the result to the second SDR system via the network adapter.

6. The system of claim 1, wherein the determining further comprises:
parsing a set of packets in the communication completely from a physical layer through an application layer, the communication being from a new IoT device for which the protocol has not been identified;
comparing the set of packets with a set of known protocol definitions in the memory medium;
building a stack using the set of packets;
filling in any missing information in the stack with additional packets from additional obtained communications received from the new IoT device by other SDR devices; and
determining the protocol of the communications based on the stack.

7. A method for enabling heterogeneous device communications in an internet of things (IoT) environment, comprising:
obtaining, by a software defined radio (SDR) device of a plurality of SDR devices in the IoT environment, a set of communications sent by an IoT device, each SDR device of the plurality of SDR devices having an SDR bot deployed thereon that is designed to process a single set type of communication;
determining, based on an analysis of the set of communications by an SDR bot running on the SDR device collaborating with other SDR bots on the plurality of SDR device, a protocol of the set of communications;
forwarding a simulation packet to the IoT device using the determined protocol in order to verify a format of the determined protocol;
verifying, in response to a receipt of a protocol-compliant response from the IoT device in reaction to the simulation packet, that the determined protocol is associated with the IoT device;
interpreting a communication of the set of communications by the SDR bot based on the protocol; and
forwarding, by the SDR device, a notification in the communication from the IoT device based on the interpreted communication, wherein the forwarding of the notification includes sending, via the network adapter, an instruction initiated by the IoT device to a second IoT device using a second technology in a protocol of the second IoT device that causes the second IoT device to perform an action based on information about the IoT device contained in the interpreted communication.

8. The method of claim 7, further comprising performing spectrum scanning to scan an electromagnetic (EM) spectrum for communications from IoT devices within a capture range of the SDR device.

9. The method of claim 7, wherein the communication technology is selected from a group, comprising: radio frequency identification (RFiD), WiFi, wireless, Bluetooth, and infrared.

10. The method of claim 7, wherein the forwarding of the notification includes sending, from the SDR device, an instruction to a second IoT device in a protocol of the second IoT device that causes the second IoT device to perform an action based on the interpreted communication.

11. The method of claim 7, further comprising:
interpreting a second communication of a second set of communications sent by a second IoT device; and
aggregating information from the interpreted communication and the interpreted second communication, wherein the forwarding of the notification includes forwarding a report based on the aggregation.

12. The method of claim 7, further comprising:
storing a result of the determining in a memory medium of the SDR device;
analyzing a third set of communications in response to a receipt at the SDR device of an inquiry from a second SDR device regarding the third set of communications;
determining, based on the result, the protocol of the third set of communications; and
forwarding, in response to the determining, the result from the SDR device to the second SDR device.

13. The method of claim 7, wherein the determining further comprises:
parsing a set of packets in the communication completely from a physical layer through an application layer;
comparing the set of packets with a set of known protocol definitions in the memory medium;
building a stack using the set of packets;
filling in any missing information in the stack with additional packets from additional obtained communications received from the new IoT device by other SDR devices; and
determining the protocol of the communications based on the stack.

14. A computer program product for enabling heterogeneous device communications in an internet of things (IoT) environment, the computer program product comprising a computer readable storage media, and program instructions stored on the computer readable storage media, that cause at least one computer device to:
obtain, by a software defined radio (SDR) device of a plurality of SDR devices in the IoT environment, a set of communications sent by an IoT device, each SDR device of the plurality of SDR devices having an SDR bot deployed thereon that is designed to process a single set type of communication;
determine, based on an analysis of the set of communications by an SDR bot running on the SDR device collaborating with other SDR bots on the plurality of SDR device, a protocol of the set of communications;
forward a simulation packet to the IoT device using the determined protocol in order to verify a format of the determined protocol;
verify, in response to a receipt of a protocol-compliant response from the IoT device in reaction to the simulation packet, that the determined protocol is associated with the IoT device;
interpret a communication of the set of communications by the SDR bot based on the protocol; and
forward, by the SDR device, a notification in the communication from the IoT device based on the interpreted communication, wherein the forwarding of the notification includes sending, via the network adapter, an instruction initiated by the IoT device to a second IoT device using a second technology in a protocol of the second IoT device that causes the second IoT device to perform an action based on information about the IoT device contained in the interpreted communication.

15. The program product of claim 14,
wherein the communication technology is selected from a group, comprising: radio frequency identification (RFiD), WiFi, wireless, Bluetooth, and infrared, but not limited to this.

16. The program product of claim 14, wherein the program instructions that cause the at least one computer device to forward the notification include sending, from the SDR device, an instruction to a second IoT device in a protocol of the second IoT device that causes the second IoT device to perform an action based on the interpreted communication.

17. The program product of claim 14, the program instructions further causing the at least one computer device to:
   interpret a second communication of a second set of communications sent by a second IoT device; and
   aggregate information from the interpreted communication and the interpreted second communication,
   wherein the forwarding of the notification includes forwarding a report based on the aggregation.

18. The program product of claim 16, the program instructions further causing the at least one computer device to:
   store a result of the determining in a memory medium of the SDR device;
   analyze a third set of communications in response to a receipt at the SDR device of an inquiry from a second SDR device regarding the third set of communications;
   determine, based on the result, the protocol of the third set of communications; and
   forward, in response to the determining, the result from the SDR device to the second SDR device.

19. The program product of claim 14, wherein the program instructions that cause the at least one computer device to determine further causes the at least one computer device to:
   parse a set of packets in the communication completely from a physical layer through an application layer;
   compare the set of packets with a set of known protocol definitions in the memory medium;
   build a stack using the set of packets;
   fill in any missing information in the stack with additional packets from additional obtained communications received from the new IoT device by other SDR devices; and
   determine the protocol of the communications based on the stack.

20. The system of claim 1, the set of tasks further comprising:
   receiving, by the SDR bot, a request from a mobile device of a support person to identify regions of bad link quality;
   disseminating, in response to receipt of the request, a query to fetch link quality information directed to every IoT device in the IoT environment in the determined protocol associated with the IoT device; and
   provide analytics of link quality to the support person based on the link quality information sent by IoT devices.

* * * * *